US012493260B2

(12) United States Patent
Mizuguchi

(10) Patent No.: US 12,493,260 B2
(45) Date of Patent: Dec. 9, 2025

(54) IMAGE FORMING APPARATUS

(71) Applicant: CANON KABUSHIKI KAISHA, Tokyo (JP)

(72) Inventor: Kohei Mizuguchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/918,971

(22) Filed: Oct. 17, 2024

(65) Prior Publication Data

US 2025/0130522 A1 Apr. 24, 2025

(30) Foreign Application Priority Data

Oct. 20, 2023 (JP) ................................ 2023-181413

(51) Int. Cl.
*G03G 15/00* (2006.01)
*G03G 15/20* (2006.01)

(52) U.S. Cl.
CPC ....... *G03G 15/657* (2013.01); *G03G 15/2028* (2013.01); *G03G 15/5029* (2013.01); *G03G 15/6511* (2013.01); *G03G 2215/00413* (2013.01)

(58) Field of Classification Search
CPC ............. G03G 15/657; G03G 15/2028; G03G 15/5029; G03G 15/6511; G03G 2215/00413
See application file for complete search history.

(56) References Cited

U.S. PATENT DOCUMENTS

| | | | | |
|---|---|---|---|---|
| 2007/0182091 A1* | 8/2007 | Kubochi | G03G 15/657 | 271/265.01 |
| 2007/0248366 A1* | 10/2007 | Gettelfinger | G03G 15/6511 | 399/388 |
| 2013/0257956 A1* | 10/2013 | de Jong | B41J 11/0095 | 347/16 |
| 2017/0123354 A1* | 5/2017 | Ebihara | G03G 15/2039 | |
| 2017/0152116 A1* | 6/2017 | Hashimoto | G03G 15/6511 | |
| 2019/0092592 A1* | 3/2019 | Suzuki | B65H 5/068 | |

FOREIGN PATENT DOCUMENTS

| | | |
|---|---|---|
| JP | 2005181507 A | 7/2005 |
| JP | 2007041188 A | 2/2007 |

* cited by examiner

*Primary Examiner* — David H Banh

(74) *Attorney, Agent, or Firm* — Canon U.S.A., Inc. IP Division

(57) ABSTRACT

An image forming apparatus includes a transfer unit configured to transfer a toner image on the sheet, a fixing unit configured to fix the toner image transferred by the transfer unit to the sheet, a detection unit configured to detect the amount of deflection, and a control unit configured to control a speed of conveyance of the sheet based on a detection result from the detection unit, wherein the detection unit includes, a first pivoting member configured to be pivoted about a first pivot shaft in a first pivoting direction by the sheet pressing the first pivoting member, a second pivoting member configured to be pivoted about a second pivot shaft that is different from the first pivot shaft in a second pivoting direction by the first pivoting member pressing the second pivoting member, and a sensor configured to detect a pivotal movement of the second pivoting member.

8 Claims, 10 Drawing Sheets

IMAGE FORMING APPARATUS

BACKGROUND

Field

The present disclosure relates to an image forming apparatus that forms an image on a sheet.

Description of the Related Art

Japanese Patent Application Laid-Open No. 2005-181507 discusses a loop detecting sensor for determining whether a loop formed in a sheet with a transfer unit and a fixing roller reaches a predetermined amount. The loop detecting sensor includes a flag that is pivoted by a sheet encountering the flag, and a photo-interrupter capable of switching between its light-shielding state and its light-transmissive state by the pivotal movement of the flag.

Additionally, Japanese Patent Application Laid-Open No. 2007-041188 discusses an image forming apparatus in which two light-transmissive loop detecting sensors are provided between a secondary transfer unit and a fixing device. The image forming apparatus includes an actuator that is pivoted by a sheet coming into contact with the actuator, and the actuator includes two protruding pieces capable of each blocking the corresponding optical axis of the optical axes of the two loop detecting sensors. These two loop detecting sensors block the optical axes with the protruding pieces to output off-signals, and output on-signals with the optical axes not blocked. The image forming apparatus combines signals from the two loop detecting sensors, allowing detections of four types of the amount of loop.

Meanwhile, sheets used for image forming apparatuses come in various types of paper, such as thin paper, plain paper, and thick paper. In sheet conveyance, a sheet with low rigidity, such as thin paper, especially, can fail to press the flag disclosed in Japanese Patent Application Laid-Open No. 2005-181507 or the actuator disclosed in Japanese Patent Application Laid-Open No. 2007-041188, causing the loop detecting sensors to make an erroneous detection. Further, in the image forming apparatus disclosed in Japanese Patent Application Laid-Open No. 2007-041188, the two loop detecting sensors and the actuator including the two protruding pieces are disposed to prevent erroneous detections, which results in a complicated configuration.

SUMMARY

The present disclosure is directed to providing an image forming apparatus capable of reducing erroneous detections with a sheet detecting unit using a flag.

According to an aspect of the present disclosure, an image forming apparatus includes a transfer unit configured to convey a sheet while nipping the sheet, and transfer a toner image on the sheet, a fixing unit configured to convey the sheet while nipping the sheet, and fix the toner image transferred by the transfer unit to the sheet, a detection unit disposed between the transfer unit and the fixing unit in a sheet conveyance direction and configured to detect the amount of deflection in the sheet nipped by the transfer unit and the fixing unit, and a control unit configured to control a speed of conveyance of the sheet by the fixing unit based on a detection result from the detection unit, wherein the detection unit includes, a first pivoting member configured to be pivoted about a first pivot shaft in a first pivoting direction by the sheet pressing the first pivoting member, the sheet being nipped by the transfer unit and the fixing unit, a second pivoting member configured to be pivoted about a second pivot shaft that is different from the first pivot shaft in a second pivoting direction by the first pivoting member pressing the second pivoting member, and a sensor configured to detect a pivotal movement of the second pivoting member.

Further features of the present disclosure will become apparent from the following description of exemplary embodiments with reference to the attached drawings.

DESCRIPTION OF THE EMBODIMENTS

[Overall Configuration]

Figure 1:
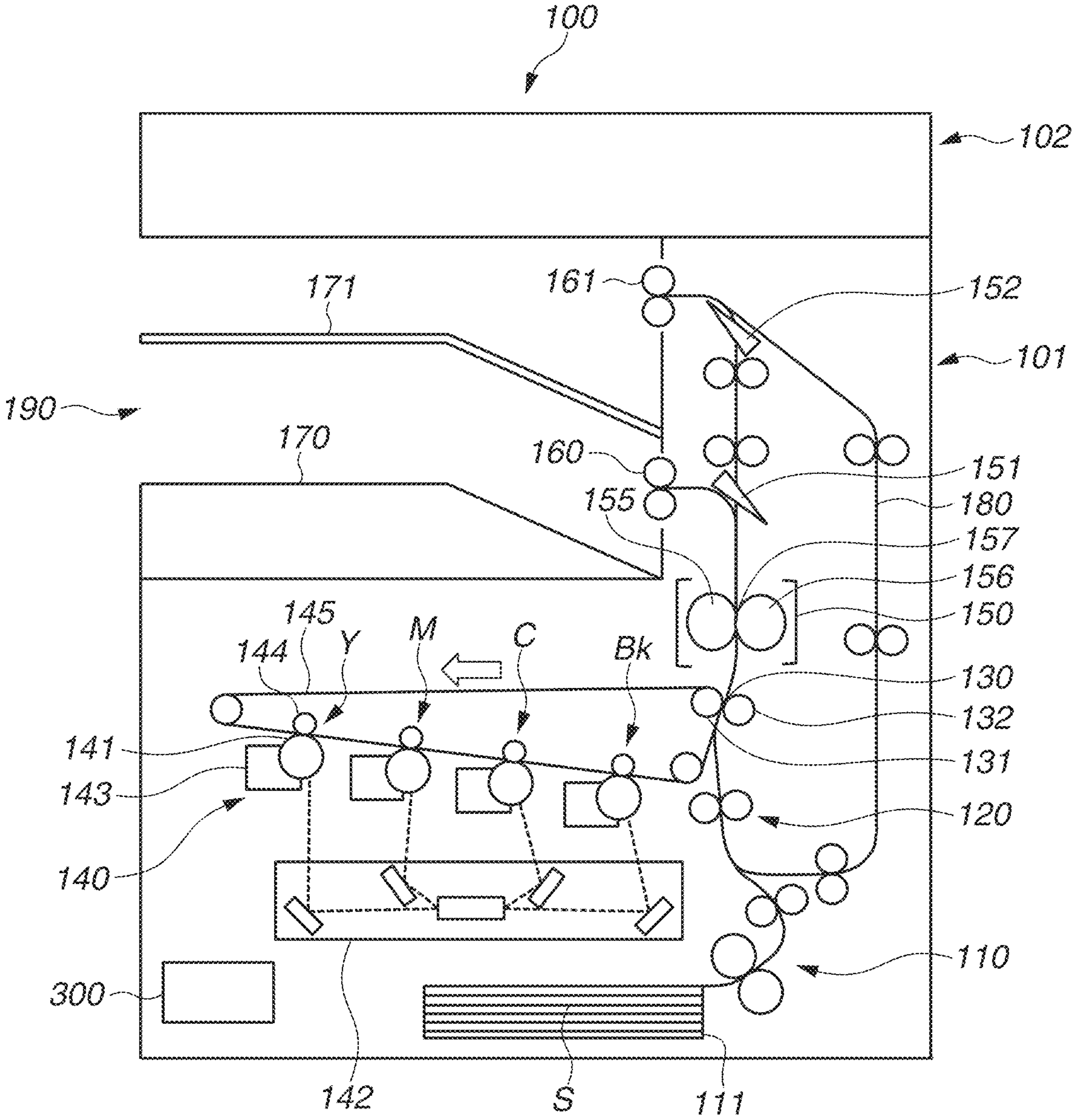
FIG. 1 is an overall schematic view illustrating a cross-sectional configuration of an image processing apparatus according to an exemplary embodiment.

FIG. 1 is an overall schematic view illustrating a cross-sectional configuration of an image forming apparatus 100 according to an exemplary embodiment of the present disclosure. The image forming apparatus 100 includes an image forming unit 140 that forms an image on a sheet S as a recording material, a feeding unit 110, a fixing device 150, and an image reading device 102. Additionally, the image forming apparatus 100 includes an apparatus main body 101, which is a housing that houses the image forming unit 140.

The image forming unit 140 is an electrophotography unit with a tandem intermediate transfer system, where image forming stations Y, M, C, and Bk that form toner images in four colors are arranged along an intermediate transfer belt 145.

Sheets S are stored in a cassette 111 provided in the lower portion of the apparatus main body 101, and fed one by one via the feeding unit 110. The feeding unit 110, for example, includes a feeding roller that feeds a sheet S, and a separating roller that is disposed in contact with the feeding roller and that causes a frictional force to act against a sheet S to separate the sheet S from the rest of sheets S being fed by the feeding roller. Various kinds of sheets with different sizes and different materials can be used, such as paper like plain paper and thick paper, some sheet materials subjected to surface treatment including a plastic film, a cloth, and coated paper, other sheet materials in special shapes including an envelope and index paper.

A sheet S fed from the feeding unit 110 is subjected to skew correction by a skew correction device 120, and is conveyed to a transfer nip 130 synchronously with a toner image formation process performed by the image forming unit 140. The transfer nip 130 as a transfer portion is a nip portion formed between a secondary inner transfer roller 131 and a secondary outer transfer roller 132 that are substantially opposed to each other across the intermediate transfer belt 145, and conveys a sheet while being nipped.

The image forming unit 140 performs the toner image formation process in parallel with the above-mentioned conveyance process of conveying the sheet S to the transfer nip 130. The image forming stations Y, M, C, and Bk of the image forming unit 140 each includes a photosensitive drum 141 as an image-bearing member in a drum shape (an electrophotographic photosensitive member), a charging unit, such as a charging roller, and a development device 143 as a development unit. Additionally, the image forming unit 140 includes an exposure device 142 disposed under the four photosensitive drums 141. In the toner image formation process, the charging units uniformly charge the surfaces of the photosensitive drums 141, and the exposure device 142 exposes photosensitive drums 141 based on image information signals for an image formation to be performed to write electrostatic-latent images on the photosensitive drums 141. The electro-static latent images are developed with toner supplied from the development devices 143, forming single color toner images. This operation forms the toner images in colors of yellow, magenta, cyan, and black on the respective surfaces of the four photosensitive drums 141.

The intermediate transfer belt 145 is driven counterclockwise in FIG. 1. The toner images borne by the four photosensitive drums 141 are sequentially primarily transferred to the intermediate transfer belt 145 by primary transfer rollers 144 to be superimposed on one another. As a result, a full color toner image is eventually formed on the intermediate transfer belt 145, and is conveyed to the transfer nip 130 while being borne by the intermediate transfer belt 145. With a force of pressure and an electrostatic bias being applied at the transfer nip 130, the toner image is secondarily transferred from the intermediate transfer belt 145 to a sheet S.

The sheet S through the transfer nip 130 is conveyed to the fixing device 150. The fixing device 150 includes a fixing roller 155 provided with a built-in heater, and a pressure roller 156 that is brought into contact with the fixing roller 155 by a predetermined force of pressure. The fixing roller 155 is driven by a driving source, such as a motor, which is not illustrated, and the pressure roller 156 is rotated by the rotation of the fixing roller 155. The fixing device 150 applies pressure and heat to the toner image on the sheet S conveyed while the sheet S is being nipped by a fixing nip 157 as a fixing portion formed between the fixing roller 155 and the pressure roller 156. This configuration causes toner to be melted and after a sheet S passes through the fixing nip, be solidified to fix the image to the sheet S.

The sheet S through the fixing device 150 is guided by a first guide member 151 to a pair of first discharge rollers 160 or to a pair of second discharge rollers 161. When images are formed on both sides of a sheet S, the sheet S, with an image formed on a first side, is guided by the first guide member 151 to the pair of second discharge rollers 161, and partially conveyed to the outside of the apparatus main body 101 by the pair of second discharge rollers 161. In response to when the trailing end of the sheet S in a conveyance direction passes a second guide member 152, the pair of second discharge rollers 161 reverses the conveyance direction of the sheet S, and conveys the sheet S to a double-sided conveyance path 180. The portion of the sheet S protruding to the outside of the apparatus main body 101 during the reverse operation performed by the pair of second discharge rollers 161 is supported by a second discharge tray 171. The sheet S through the double-sided conveyance path 180 is subjected to a skew correction and timing correction at the skew correction device 120, passes through the transfer nip 130 and the fixing device 150. This forms an image on a second side of the sheet S.

In sheet discharge, a sheet S conveyed from the fixing device 150 is guided by the first guide member 151 to the pair of first discharge rollers 160, and discharged to the outside of the apparatus main body 101 by the pair of first discharge rollers 160. A first discharge tray 170 is provided in the upper portion of the apparatus main body 101, and the sheets S discharged by the pair of first discharge rollers 160 are stacked neatly on the first discharge tray 170. The upper surfaces of the first discharge tray 170 and the second discharge tray 171 are inclined upward to the downstream in the sheet discharge direction. A sheet S stacked on the first discharge tray 170 or the second discharge tray 171 slides toward the upstream in the sheet discharge direction along the inclination of the first discharge tray 170 or the second discharge tray 171 under its own weight. Alignment surfaces extending in up-and-down directions are provided upstream of the first discharge tray 170 and the second discharge tray 171 in the sheet discharge direction. When the trailing end of the sheet S that slides along the inclination of the first discharge tray 170 or the second discharge tray 171 abuts the alignment surface, positions of the sheets stacked in a bundle on the first discharge tray 170 or the second discharge tray 171 are aligned.

The image forming apparatus 100 includes the image reading device 102 mounted over the apparatus main body 101. The image reading device 102 includes a platen glass on which a document is placed, and an image sensor that reads an image on the document via the platen glass. Additionally, the image reading device 102 includes an automatic document feeding device that feeds a document set on a document tray one by one and causes the image sensor to read the image. The image forming apparatus 100 according to the present exemplary embodiment employs an inside discharge system in a configuration where an inside discharge space 190 for the sheets S is formed between the image forming unit 140 and the image reading device 102 in the up-and-down directions. The configuration with the inside discharge system has an advantage over a configuration with the first discharge tray 170 mounted on one side of the apparatus main body 101, for example, in the small occupied area of the image forming apparatus 100 as viewed from above.

Additionally, the above-mentioned image forming unit 140 is an example of an image forming unit, and an electrophotography unit that employs a direct transfer system that transfers a toner image formed on a photosensitive member to a sheet without an intermediate transfer body can be used.

[Detection Unit]

Figure 2:
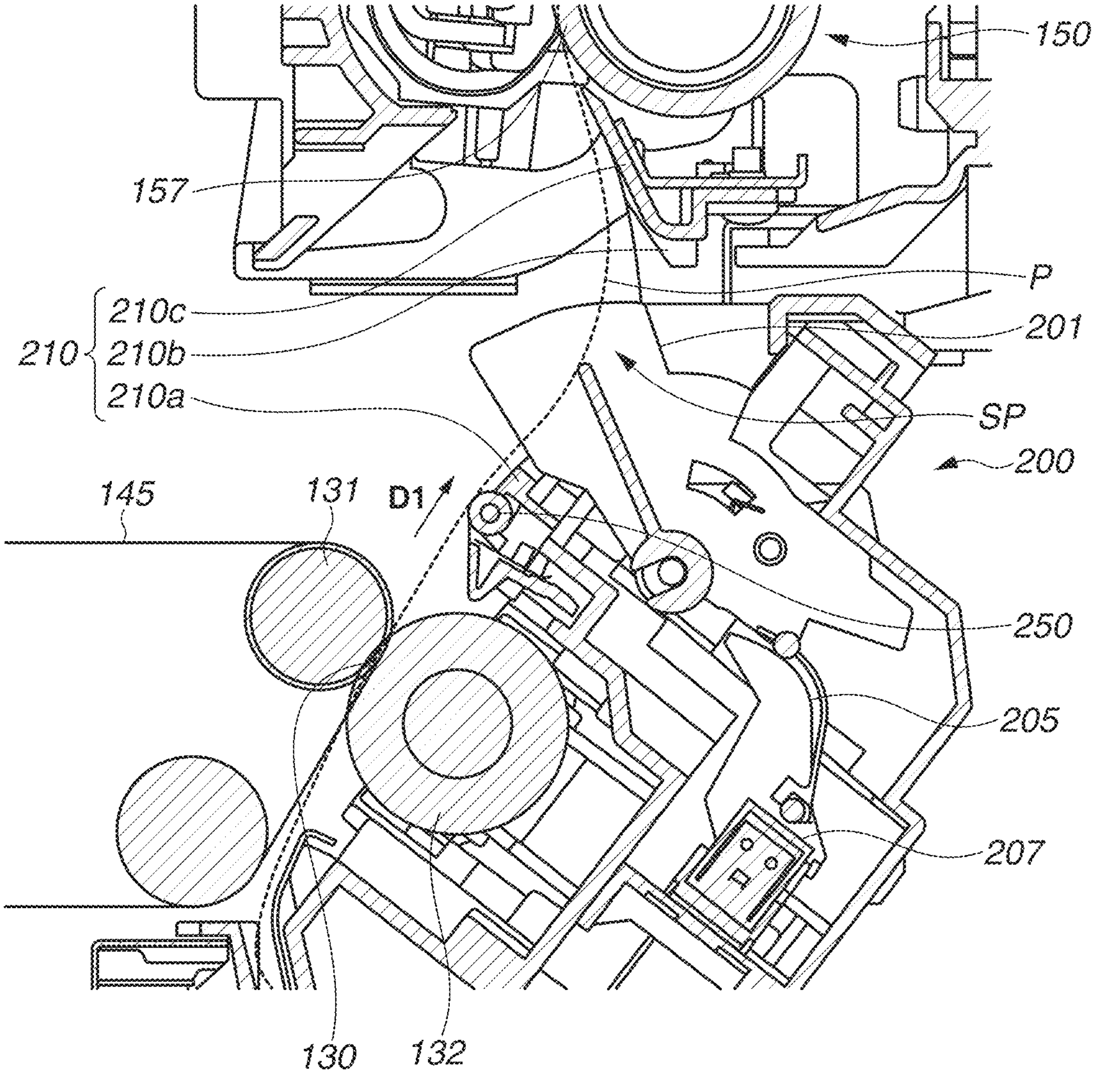
FIG. 2 is a cross-sectional view illustrating a detection unit.
Figure 3:
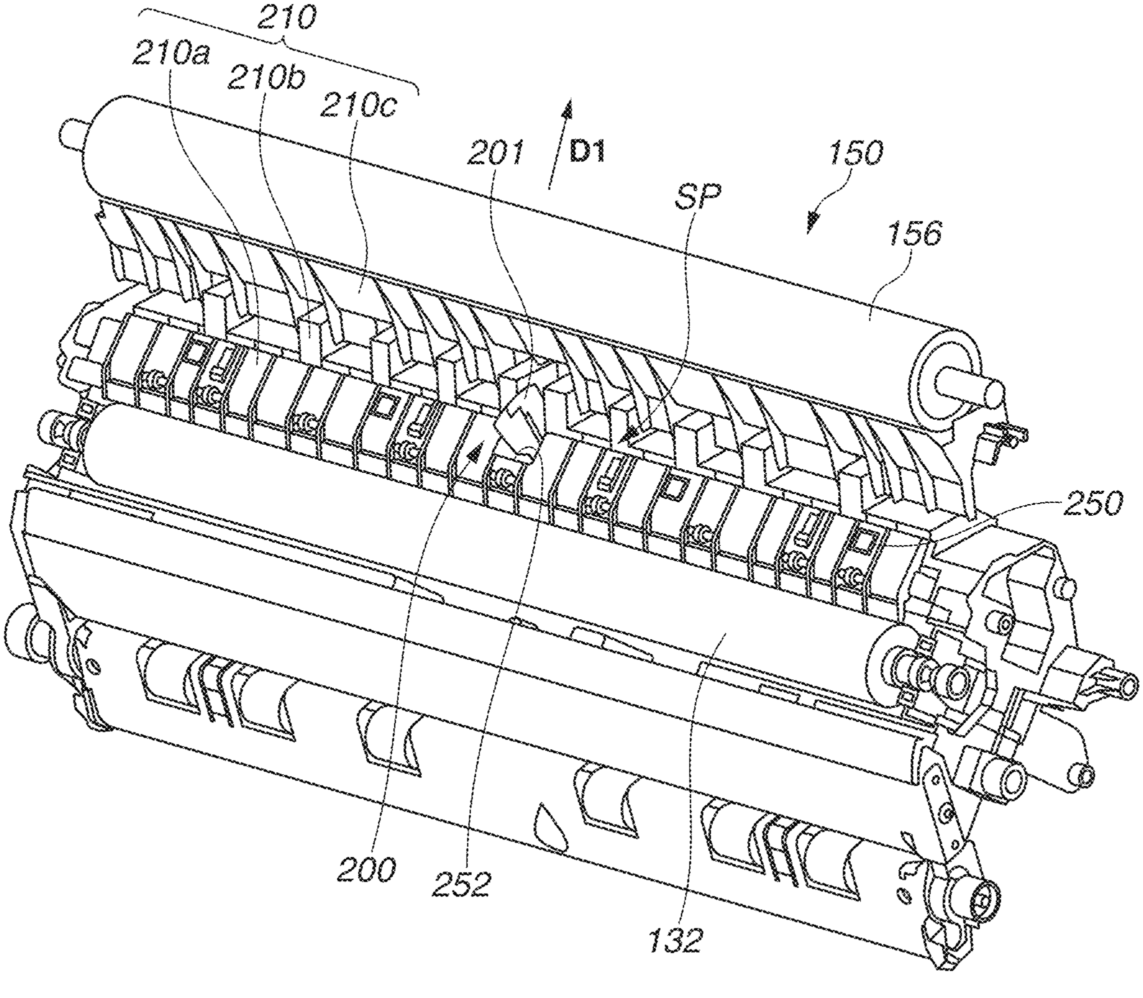
FIG. 3 is a perspective view illustrating the detection unit and a conveyance guide.
Figure 4:
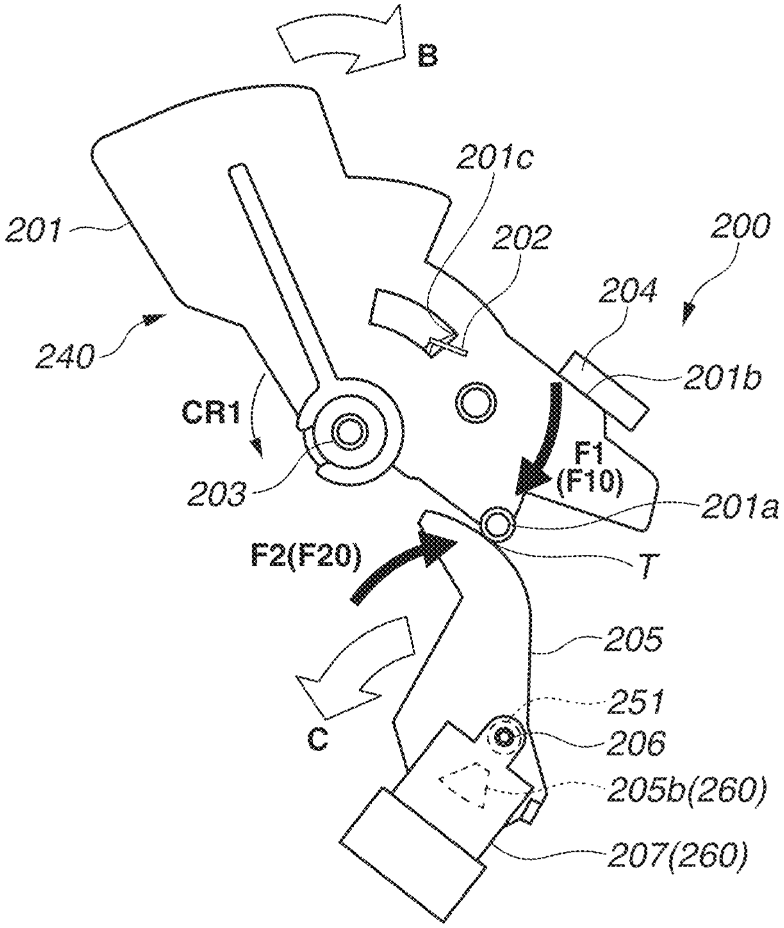
FIG. 4 is a side view illustrating the detection unit in a standby state.
Figure 5:
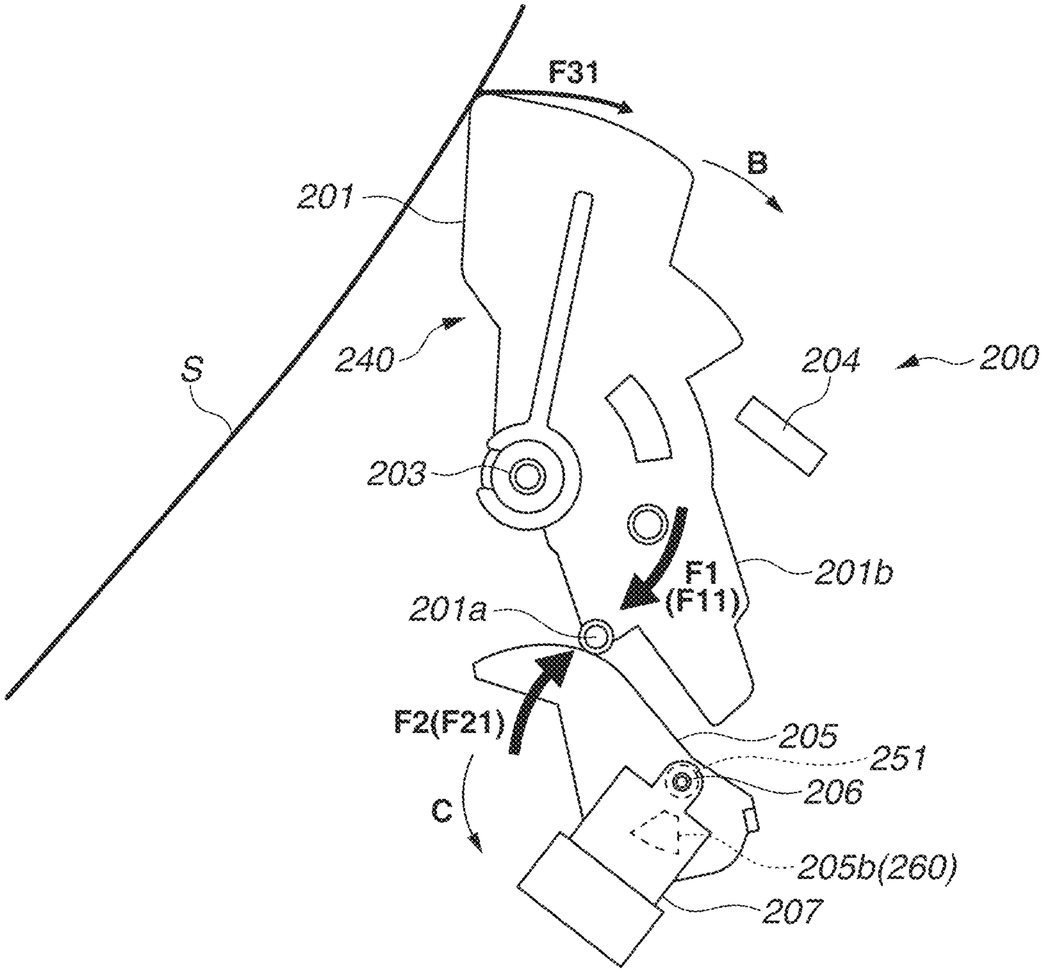
FIG. 5 is a side view illustrating the detection unit in a detection state.

A description will now be given of a detection unit 200 disposed between the transfer nip 130 and the fixing nip 157 in a sheet conveyance direction D1, and a peripheral configuration of the detection unit 200. FIG. 2 is a cross-sectional view illustrating the detection unit 200. FIG. 3 is a perspective view illustrating the detection unit 200 and a conveyance guide 210. FIG. 4 is a side view illustrating the detection unit 200 in a standby state. FIG. 5 is a side view illustrating the detection unit 200 in a detection state.

As illustrated in FIG. 2, a sheet S is conveyed in the sheet conveyance direction D1 via the transfer nip 130. The conveyance guide 210 and the detection unit 200 are disposed between the transfer nip 130 and the fixing nip 157 in the sheet conveyance direction D1. The conveyance guide 210 is disposed facing the non-image-side surface of the sheet S to prevent smudging an image to be fixed on the sheet S. More specifically, no conveyance guide is provided facing the image-side surface of the sheet S that comes into contact with the intermediate transfer belt 145, and the image-side surface of the sheet S is not in friction contact with any member of the apparatus main body 101 from the transfer nip 130 to the fixing nip 157.

The conveyance guide 210 as a guide member includes a first guide portion 210*a*, a second guide portion 210*b*, and a third guide portion 210*c*. The first guide portion 210*a*, the second guide portion 210*b*, and the third guide portion 210*c* can be integrally formed or separately formed. The first guide portion 210*a* supports a plurality of follower rollers 250 driven in sequence by frictional contact with the non-image-side surface of the sheet S. The plurality of follower rollers 250 is aligned in a width direction W, as illustrated in FIG. 3.

The conveyance guide 210 is configured to deflect a sheet S toward the conveyance guide 210 as indicated by a broken line in FIG. 2, instead of linearly guiding the sheet S between the transfer nip 130 and the fixing nip 157. In this manner, the conveyance guide 210 forms a loop formation space SP that allows a sheet to be deflected. In the present exemplary embodiment, a sheet S in a curved state, instead of a linear state, when viewed from a rotational axis direction of the secondary outer transfer roller 132, is referred to as "deflection" or "formation of a loop". The "loop" in the present exemplary embodiment means the deflection in a sheet S.

As illustrated in FIG. 3, the detection unit 200 is disposed in the central portion of the loop formation space SP in the width direction W. Thus, the detection unit 200 is disposed in the central portion on the conveyance path between transfer nip 130 and the fixing nip 157 in the width direction W. The width direction W is a direction orthogonal to the sheet conveyance direction D1, and is a direction that is parallel with the rotational axis directions of the secondary outer transfer roller 132 and the pressure roller 156. The detection unit 200 is capable of detecting the amount of deflection in the sheet S in the loop formation space SP. The amount of deflection is the amount (the distance) of deflection in the sheet S from the linear state toward the loop formation space SP when viewed from the width direction W. For example, the amount of deflection can be represented by a distance from a straight line connecting the fixing nip 157 and a contact point between one of the plurality of follower rollers 250 and the sheet S to the vertex of the deflection (loop) formed in the sheet S.

The detection unit 200 is disposed at substantially the middle position between the transfer nip 130 and the fixing nip 157 in the sheet conveyance direction D1, and is capable of detecting the amount of deflection in the sheet S with high accuracy. Additionally, since the detection unit 200 is disposed at substantially the middle portion of the loop formation space SP in the width direction W, the amounts of deflections of sheets the size ranging from the minimum to the maximum available for the image forming apparatus 100 can be detected.

As illustrated in FIG. 4, the detection unit 200 includes a first flag 201 as a first pivoting member, a second flag 205 as a second pivoting member, and a sensor 207. The first flag 201 is supported pivotable about a first pivot shaft 203, and includes a contacting portion 201*a*, an abutting portion 201*b*, and a spring support portion 201*c*. The contacting portion 201*a* is configured to come in contact with or in friction contact with the second flag 205, and one end portion of a first flag spring 202 is attached to the spring support portion 201*c*.

The first flag spring 202 as a first urging member is, for example, a torsion coil spring. The coil portion of the first flag spring 202 is supported by the first pivot shaft 203. Further, one end portion that extends from the coil portion of the first flag spring 202 to one side is retained by the spring support portion 201*c*, and the other end portion that extends from the coil portion to the other side is retained by a fixed member of the apparatus main body 101. The first flag 201 is urged by the first flag spring 202 in an F1 direction as a first pivoting direction about the first pivot shaft 203.

Figure 9:
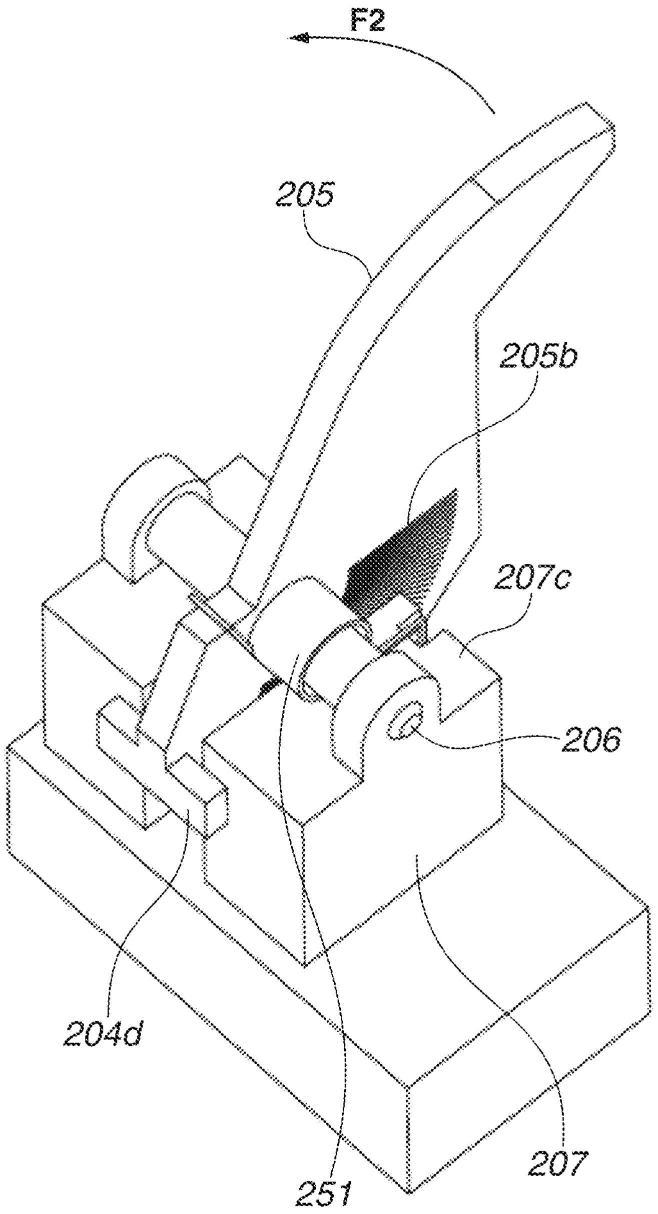
FIG. 9 is a perspective view illustrating a second flag and a sensor.
Figure 10:
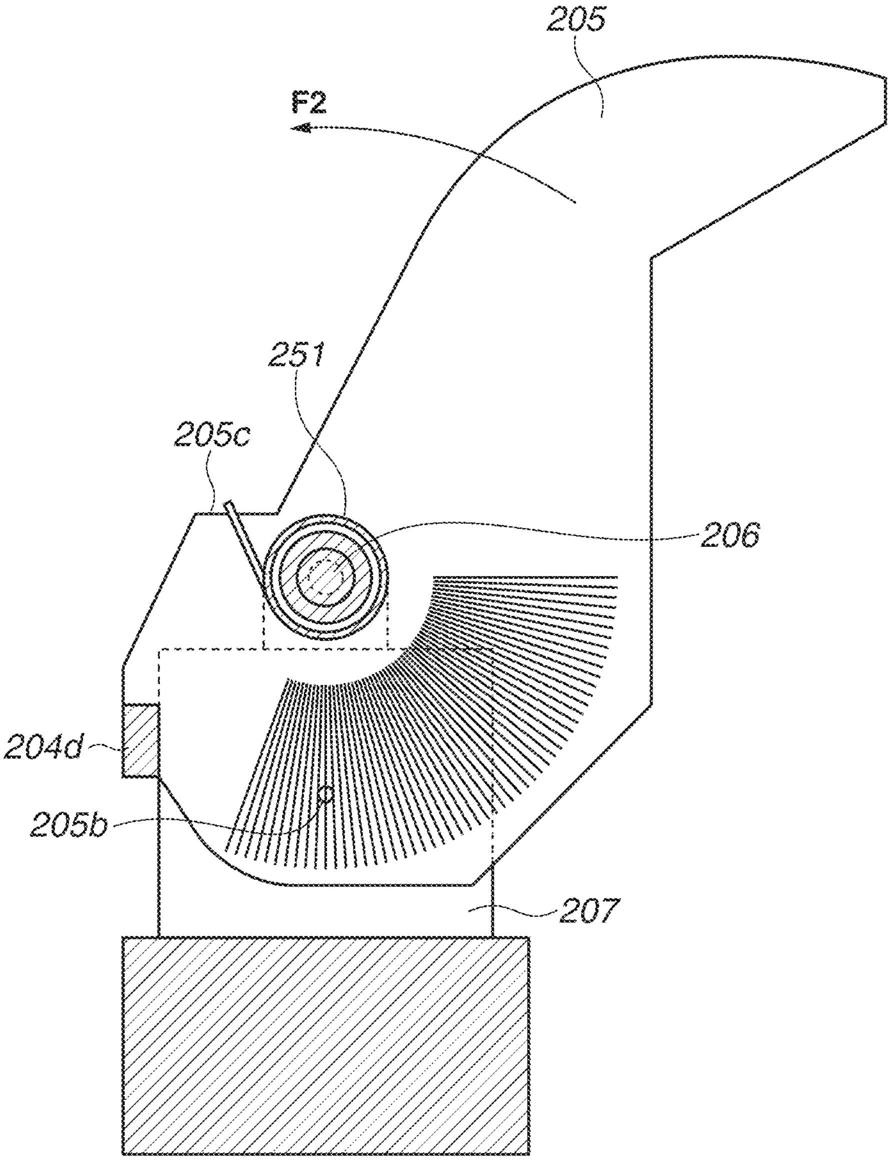
FIG. 10 is a side view illustrating the second flag and the sensor.

FIG. 9 is a perspective view illustrating the second flag 205 and the sensor 207. FIG. 10 is a side view illustrating the second flag 205 and the sensor 207. As illustrated in FIGS. 4, 9, and 10, the second flag 205 is supported pivotable about a second pivot shaft 206, which is different from the first pivot shaft 203, and includes a to-be-detected portion 205*b*. A second flag spring 251 as a second urging member is, for example, a torsion coil spring. The coil portion of the second flag spring 251 is supported by the second pivot shaft 206. Further, one end portion that extends from the coil portion of the second flag spring 251 to one side is retained by a spring support portion 205*c* of the second flag 205, and the other end portion that extends from the coil portion to the other side is retained by a spring support portion 207*c* provided in the sensor 207. The other end portion of the second flag spring 251 can be retained by another fixing member of the apparatus main body 101. The second flag 205 is urged by the second flag spring 251 in an F2 direction as a third pivoting direction about the second pivot shaft 206.

As illustrated in FIG. 4, when the detection unit 200 is in a standby state, an urging force F20 applied by the second flag spring 251 is set to be larger than an urging force F10 applied by the first flag spring 202 at a contact point T between the contacting portion 201*a* and the second flag 205. Thus, the relation of F20>F10 is satisfied. For this reason, the first flag 201 is urged in a CRI direction, which is the opposite direction from the F1 direction, about the first pivot shaft 203, and is held in a state where the abutting portion 201*b* of the first flag 201 is in contact with a stopper 204. The stopper 204 is supported by a fixing member of the apparatus main body 101, and restricts pivotal movement of the first flag 201 in the CRI direction as a fourth pivoting direction. At this time, the first flag 201 and the second flag 205 are at respective standby positions.

As illustrated in FIG. 3, the first guide portion 210*a* has an opening 252, through which the first flag 201 at the standby position protrudes into the loop formation space SP.

The first flag 201 protruding into the loop formation space SP, as described above, can come into contact with sheets S conveyed via the transfer nip 130 and the fixing nip 157.

As illustrated in FIG. 5, the first flag 201 is pressed by the sheet S nipped by the transfer nip 130 and the fixing nip 157, and is pivoted about the first pivot shaft 203 in an arrow direction B (an F1 direction). The detection unit 200 is in a detection state with the first flag 201 pivoted from the standby position in the arrow direction B (the F1 direction) in this manner.

With the detection unit in a detection state, when a force applied to the first flag 201 by the sheet S in the F1 direction is a force F31, a relation of F20<F10+F31 is satisfied. As illustrated in FIG. 5, the contacting portion 201*a* of the first flag 201 presses the second flag 205, pivoting the second flag 205 about the second pivot shaft 206 in an arrow direction C as a second pivoting direction, which is the opposite direction from the F2 direction. The arrow direction C is the opposite direction from the arrow direction B (the F1 direction).

The first flag 201 and the second flag 205 stop when an urging force F11 applied by the first flag spring 202, an urging force F21 applied by the second flag spring 251, and the force F31 applied by the sheet S, at the contact point T, satisfy a relation of F21=F11+F31. The respective positions at which the first flag 201 and the second flag 205 stop after the pivotal movements from the respective standby positions are detection positions.

In this manner, the second flag 205 is pivoted from the standby position to the detection position in conjunction with the pivotal movement of the first flag 201 pressed by the sheet S. The first flag 201 and the second flag 205 consist of a pivoting portion 240 that is pivoted by the sheet S pressing the pivoting portion 240. The sensor 207 is capable of detecting the amount of pivotal movement of the second flag 205 from the standby position to the detection position. For example, the sensor 207 includes a photo-interrupter that includes a light-emitting element and a light-receiving element. A photoelectric system rotary encoder 260 includes the sensor 207 and the to-be-detected portion 205*b* in the second flag 205. The light-emitting element and the light-receiving element of the photo-interrupter are, for example, a light-emitting diode, and a photo-transistor, respectively.

When the rotary encoder 260 is a transmissive encoder, the to-be-detected portion 205*b* has a plurality of slits that allows light emitted from the light-emitting element to pass therethrough. When the rotary encoder 260 is a reflection encoder, the to-be-detected portion 205*b* includes a plurality of irregularities or slits that allow or do not allow light emitted from the light-emitting element to reflect off. The light-receiving element of the sensor 207 outputs an electric current depending on the amount of received light, and a waveform forming circuit in the rotary encoder 260 converts the waveforms of the electric currents into pulse signals, and outputs the pulse signals as voltage signals. In other words, the rotary encoder 260 reads the number of the plurality of irregularities or slits in the to-be-detected portion 205*b* corresponding to the amount of pivotal movement of the pivoting portion 240, and outputs the pulse signals.

In this manner, since the rotary encoder 260 outputs pulse signals corresponding to the amount of pivotal movement of the second flag 205 that is pivoted in conjunction with the first flag 201, the detection unit 200 is capable of detecting the amount of deflection in a sheet. The resolving power of the rotary encoder 260 can be desirably set. The rotary encoder 260 in the detection unit 200 is capable of detecting at least three types of the amount of loop in the sheets S.

[Control of the Amount of Deflection]

A description will now be given of a control of the amount of deflection in the sheet S (a control of the amount of loop) performed by a control unit 300.

Figure 6:
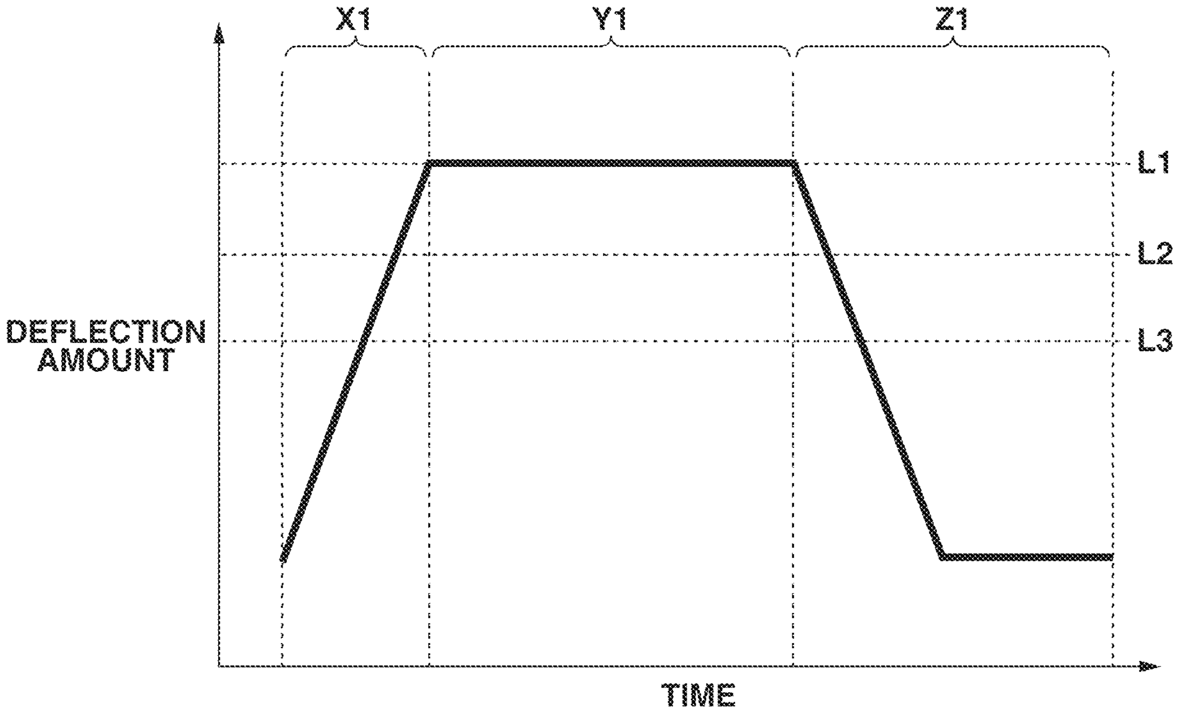
FIG. 6 is a graph illustrating a change in the amount of deflection in a sheet when a control of the amount of deflection is performed.

FIG. 6 is a graph illustrating a change in the amount of deflection in a sheet S when the control of the amount of deflection is performed. The control unit 300 (refer to FIG. 1) includes a central processing unit (CPU), a read-only memory (ROM), and a random-access memory (RAM). The CPU reads and executes various programs stored in the ROM. The RAM is used as a work area for the CPU. The control unit 300 is capable of performing control of the amount of deflection to control the sheet speed of conveyance by the fixing nip 157 based on detection results from the detection unit 200.

In the present exemplary embodiment, the speed of conveyance of a sheet S by the fixing nip 157 is set slightly slower than that by the transfer nip 130. For this reason, the sheet S being conveyed by the transfer nip 130 is being gradually deflected after arriving at the fixing nip 157. This is illustrated in a first region X1 in FIG. 6. Additionally, a solid line in FIG. 6 indicates the control of the amount of deflection when thin paper with relatively low rigidity is conveyed. It is suitable that thin paper is conveyed with a value of L1 as the amount of deflection between the transfer nip 130 and the fixing nip 157. When the speed of conveyance of the sheet S by the transfer nip 130 is a speed V1 and the speed of conveyance of the sheet S by the fixing nip 157 is a speed V2, a relation of V2<V1 holds in the first region X1.

As illustrated in a second region Y1 in FIG. 6, when the control unit 300 determines that the amount of deflection in the sheet S reaches the amount of deflection appropriate for thin paper (the L1) based on a detection result from the detection unit 200, the control unit 300 controls the fixing device 150 so that the value of the speed V2 is equal to that of the speed V1. Furthermore, as illustrated in a third region Z1 in FIG. 6, the control unit 300 reduces, based on a detection result from the detection unit 200, the amount of deflection to a state where some deflection remains shortly before the trailing end of the sheet S passes through the transfer nip 130. As a result, in the third region Z1, the control unit 300 controls the fixing device 150 so that a relation of V1<V2 holds, and, after the deflection decreases to a predetermined amount, controls the fixing device 150 so that a relation of V1=V2 holds.

In this manner, the control unit 300 controls, based on detection results from the detection unit 200, the fixing device 150 so that a deflection with the amount of deflection set depending on the type of sheets S is formed in the sheet S for at least the predetermined amount of time. In FIG. 6, a value L3 represents the amount of deflection set, for example, when thick paper with relatively high rigidity is conveyed. A value L2 represents the amount of deflection set when plain paper with intermediate rigidity between those of thin paper and thick paper is conveyed.

Thin paper is, for example, a sheet with a grammage of 52 to 59 [g/$m^2$]. Plain paper is, for example, a sheet with a grammage of 64 to 105 [g/$m^2$]. Thick paper is, for example, a sheet with a grammage of 106 to 300 [g/$m^2$].

When the intermediate transfer belt 145 receives external force from the sheet S at the transfer nip 130 in primary transfer from the photosensitive drums 141 to the intermediate transfer belt 145, the position of a toner image transferred from the photosensitive drums 141 to the intermediate transfer belt 145 can be misaligned. This causes color deviation in a full-color toner image completed by the superimposition of toner images in four colors, leading to an image defect. Thus, it is desirable that external force by the sheet S nipped between the transfer nip 130 and the fixing nip 157 be not applied to the intermediate transfer belt 145.

Additionally, when the sheet S passes the fixing nip 157, an unstable orientation of the sheet S upstream of the fixing nip 157 in the sheet conveyance direction D1 can cause creases in the sheet S. With the sheet S nipped by the transfer nip 130 and the fixing nip 157 in a tensioned state, an image to be fixed on the sheet S can be disarranged when the trailing end of the sheet S passes through a pair of rollers arranged upstream of the transfer nip 130 in the sheet conveyance direction D1. To prevent such image defects and creases in the sheet S, the adequate amount of deflection is determined depending on the type, size, or rigidity of the sheet S.

For example, a sheet with higher rigidity generally produces a larger reaction force in a deflected sate, creating a larger external force applied to the intermediate transfer belt 145 by the sheet S. Thus, in the present exemplary embodiment, the respective amounts of deflection in thick paper, plain paper, and thick paper are set to the value L1, the value L2, and the value L3 as targets, which allows the control of the amount of deflection to be perform with the adequate amount of deflection depending on the type of a sheet. Thus, when a sheet S with a first rigidity is conveyed, the control unit 300 controls the speed of conveyance of the sheet S by the fixing nip 157 so that the amount of deflection in the sheet S is a first amount of deflection. Additionally, when a sheet S with a second rigidity lower than the first rigidity is conveyed, the control unit 300 controls the speed of conveyance of the sheet S by the fixing nip 157 so that the amount of deflection in the sheet S is a second amount of deflection larger than the first amount of deflection.

This configuration can reduce image defects and creases on various types of sheets being conveyed. The amount of deflection in a sheet S can be controlled to a value as a target depending on the type of the sheet S thanks to a real-time detection with high accuracy of the amount of deflection in the sheet S through the output of pulse signals by the rotary encoder 260 corresponding to the amount of the pivotal movement of the second flag 205.

In the present exemplary embodiment described above, the amounts of deflection are set to three levels: the value L1, the value L2, and the value L3 as the targets. However, the configuration is not limited thereto. For example, the amounts of deflection can be set to four or more levels depending on types, sizes, or rigidities of sheets.

Comparative Example

Figure 7:
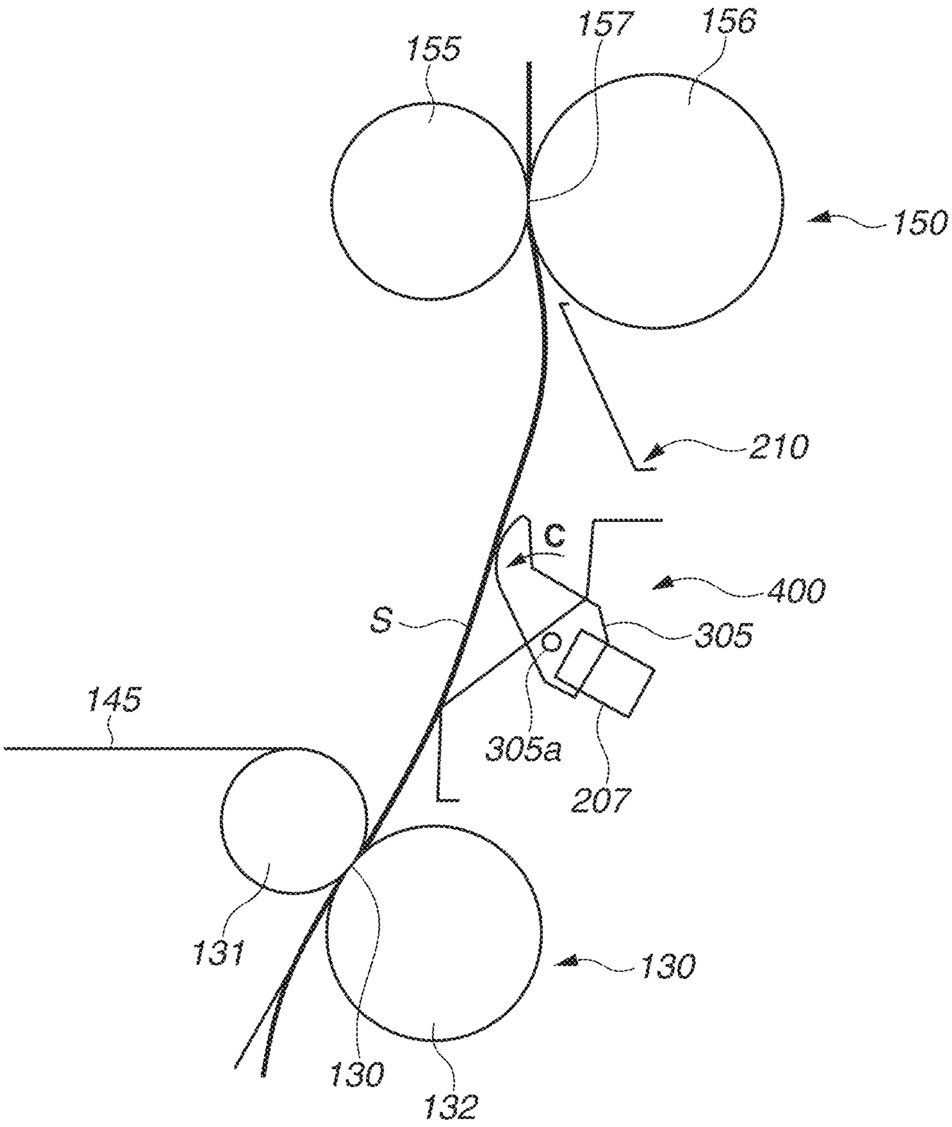
FIG. 7 is a schematic view illustrating a detection unit according to a comparative example.

A detection unit 400 according to a comparative example will now be described with reference to FIG. 7. FIG. 7 is a schematic view illustrating the detection unit 400 according to the comparative example. The configuration except for the detection unit 400 is similar to that of the above-mentioned exemplary embodiment, so that the components identical to those of the present exemplary embodiment are denoted by the identical reference numbers in FIG. 7, and the description thereof is omitted.

As illustrated in FIG. 7, the detection unit 400 includes the sensor 207 and a flag 305 configured to be pivoted about a pivot shaft 305*a* by a sheet S pressing the flag 305, the sheet S being nipped by the transfer nip 130 and the fixing nip 157. More specifically, the detection unit 400 according to the comparative example has a configuration including one flag alone instead of the configuration including two flags similar to the present exemplary embodiment.

The flag 305 is urged in the arrow direction C by a not-illustrated flag spring. The flag 305 is positioned in contact with a not-illustrated stopper at a standby position. A predetermined urging force applied by the flag spring constantly acts on the flag 305 so that the flag 305 can return to the standby position. The predetermined urging force applied by the flag spring serves as resistance force against the sheet S that presses the flag 305.

Since the conveyance guide 210 is provided facing the non-image-side surface alone of the sheet S in a section between the transfer nip 130 and the fixing nip 157, a force to push the flag 305 can be insufficient depending on the rigidity of the sheet S, resulting in a failure in detecting the amount of deflection in the sheet S. In particular, a sheet with relatively low rigidity, such as thin paper, can fail to push the flag 305 from the standby position against the urging force of the flag spring, which leads to a failure in detection by the detection unit 400.

[Action of First Flag and Second Flag]

Figure 8:
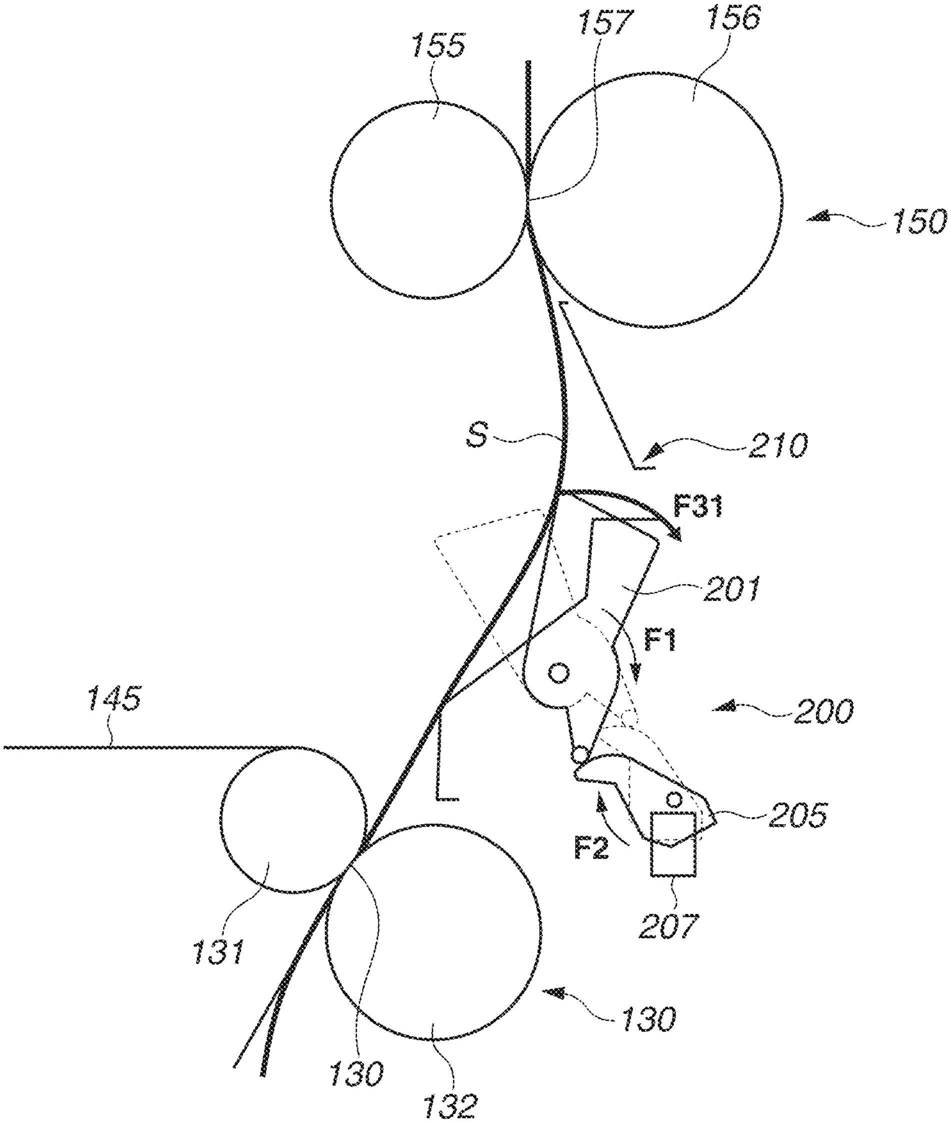
FIG. 8 is a schematic view illustrating an operation of the detection unit according to the exemplary embodiment.

In the present exemplary embodiment, as illustrated in FIGS. 4, 5, and 8, the first flag 201 is urged by the first flag spring 202 in the F1 direction. The second flag 205 is urged by the second flag spring 251 in the F2 direction, which is the opposite direction from the F1 direction. Additionally, the first flag 201 and the second flag 205 are urged by the first flag spring 202 and the second flag spring 251, respectively, to push against each other. Furthermore, the first flag spring 202 urges the first flag 201 in the direction identical to the direction in which the deflected sheet S presses the first flag 201.

In the present exemplary embodiment, when the detection unit 200 is in the standby state, the urging force F10 applied by the first flag spring 202 is set slightly smaller than the urging force F20 applied by the second flag spring 251.

This configuration allows the sheet S to press the first flag 201 with a slight force. The force F31, which is applied to the first flag 201 by the sheet S for the pivotal movement of the first flag 201 from the standby position in the F1 direction, is sufficiently small. In other words, the sheet S in contact with the first flag 201 receives a small resistance force from the first flag 201 while pressing the first flag 201, and even a sheet with low rigidity, such as thin paper, can reliably press the first flag 201, reducing erroneous detections of the detection unit 200.

As described above, in the present exemplary embodiment, the detection unit 200 including the rotary encoder 260 detects the amount of deflection in the sheet S in multiple steps. This enables controlling the amounts of deflection in various kinds of sheet with a simple configuration. Additionally, the relatively small rotary encoder 260 can increase a degree of freedom in arrangement.

Furthermore, since the first flag 201 is urged by the first flag spring 202 in the direction identical to the direction of the pivotal movement of the first flag 201 by the sheet S pressing the first flag 201, the sheet S can press the first flag 201 at the standby position. For this reason, even with thin paper with low rigidity as the sheet S, erroneous detections by the detection unit 200 can be reduced, which leads to an appropriate control of the amount of deflection.

Furthermore, since the first flag 201 and the second flag 205 are urged to come in contact with each other by respective urging forces applied by the first flag spring 202 and the second flag spring 251, the first flag 201 and the second flag 205 are constantly in contact with each other. Thus, the pivotal movement of the first flag 201 is instantly transmitted to the second flag 205. The amount of pivotal movement of the second flag 205 is detected by the sensor 207, providing an accurate detection of the amount of deflection in a sheet S.

OTHER EMBODIMENTS

The image forming apparatus according to the present exemplary embodiment includes the conveyance path from the feeding unit 110 to the pair of first discharge rollers 160 and the pair of second discharge rollers 161 extending in a vertical direction, but the configuration is not limited thereto. For example, the present disclosure can be applied to an image forming apparatus in which at least part of the conveyance path conveys the sheet S in a horizontal direction.

In the present exemplary embodiment, the fixing device 150 includes the fixing roller 155 and the pressure roller 156, but the configuration is not limited thereto. For example, in substitution for the fixing roller 155, an endless belt or a film including a built-in heater can be applied, or a belt including a heat generation layer that is heated through electromagnetic induction can be applied.

The detection unit 200 includes the two flags, or the first flag 201 and the second flag 205, but can include three flags or more. Further, one detection unit 200 alone is disposed in the substantially middle portion of the loop formation space SP in the width direction W, but a plurality of detection units 200 can be disposed in the loop formation space SP. Two detection units 200 can be disposed at respective positions that are symmetric with respect to the middle portion of the loop formation space SP in the width direction W. This enables a detection of deflection in the sheet S in a twisted state.

In the present exemplary embodiment, the stopper 204 is disposed to contact the first flag 201, but the configuration is not limited thereto. For example, the stopper 204 can be disposed to contact the second flag 205. The stopper 204 can position the first flag 201 and the second flag 205 at respective standby positions by contacting either the first flag 201 or the second flag 205. In substitution for the stopper 204 illustrated in FIG. 4, a stopper 204*d* can be provided on a part of the second flag 205 as in FIGS. 9 and 10. The stopper 204*d* comes into contact with the sensor 207 to restrict the movement of the second flag 205 in the F2 direction, positioning the second flag 205 at the standby position.

Additionally, if an urging force applied by the first flag spring 202 and an urging force applied by the second flag spring 251 are balanced with each other in a natural state and the first flag 201 and the second flag 205 are held at the respective standby positions, the stopper 204 can be omitted.

Furthermore, in the present exemplary embodiment, the second flag 205 is pivoted in the arrow direction C, which is the opposite direction from the arrow direction B (the F1 direction), by the first flag 201 that is pivoted in the arrow direction B (the F1 direction) pressing the second flag 205, but the configuration is not limited thereto. For example, the second flag 205 can be pivoted in the direction (the F2 direction) that is identical to the arrow direction B (the F1 direction) by the first flag 201 that is pivoted in the arrow direction B (the F1 direction) pressing the second flag 205. In this case, the second flag spring 251 urges the second flag 205 in the arrow direction C.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-181413, filed Oct. 20, 2023, which is hereby incorporated by reference herein in its entirety.

What is claimed is:

1. An image forming apparatus comprising:
- a transfer unit configured to convey a sheet while nipping the sheet, and transfer a toner image on the sheet;
- a fixing unit configured to convey the sheet while nipping the sheet, and fix the toner image transferred by the transfer unit to the sheet;
- a detection unit disposed between the transfer unit and the fixing unit in a sheet conveyance direction and configured to detect the amount of deflection in the sheet nipped by the transfer unit and the fixing unit; and
- a control unit configured to control a speed of conveyance of the sheet by the fixing unit based on a detection result from the detection unit, wherein the detection unit includes:
- a first pivoting member configured to be pivoted about a first pivot shaft in a first pivoting direction by the sheet pressing the first pivoting member, the sheet being nipped by the transfer unit and the fixing unit;
- a second pivoting member configured to be pivoted about a second pivot shaft that is different from the first pivot shaft in a second pivoting direction by the first pivoting member pressing the second pivoting member; and
- a sensor configured to detect a pivotal movement of the second pivoting member.

2. The image forming apparatus according to claim 1, wherein the detection unit includes:
- a first urging member configured to urge the first pivoting member in the first pivoting direction; and
- a second urging member configured to urge the second pivoting member in a third pivoting direction that is an opposite direction from the second pivoting direction, so that the second pivoting member is in contact with the first pivoting member.

3. The image forming apparatus according to claim 1, wherein the sensor includes a rotary encoder configured to output a pulse signal corresponding to the pivotal movement of the second pivoting member.

4. The image forming apparatus according to claim 2, wherein the detection unit includes a restriction portion configured to position the first pivoting member at a standby position in contact with either the first pivoting member or the second pivoting member, and wherein an urging force of the second urging member at the standby position is larger than an urging force of the first urging member.

5. The image forming apparatus according to claim 4, wherein the restriction portion is configured to restrict the pivotal movement of the first pivoting member in a fourth pivotal direction that is an opposite direction from the first pivoting direction in contact with the first pivoting member.

6. The image forming apparatus according to claim 4, further comprising a guide member forming a conveyance path between the transfer unit and the fixing unit configured to guide the sheet, wherein the first pivoting member is configured to protrude through an opening in the guide member at the standby position.

7. The image forming apparatus according to claim 1, wherein the second pivoting direction is an opposite direction from the first pivoting direction.

8. The image forming apparatus according to claim 1, wherein the control unit is configured to:

in a case where a sheet with a first rigidity is conveyed, control the speed of conveyance of the sheet by the fixing unit so that the amount of deflection in the sheet is a first deflection amount; and in a case where a sheet with a second rigidity lower than the first rigidity is conveyed, control the speed of conveyance of the sheet by the fixing unit so that the amount of deflection in the sheet is a second deflection amount larger than the first deflection amount.

* * * * *